March 10, 1953  E. LAXO  2,630,705
CAN TESTER POCKET ASSEMBLY
Filed Aug. 1, 1947  4 Sheets-Sheet 1

INVENTOR.
ED LAXO
BY
Mellin & Hanscom
ATTORNEYS

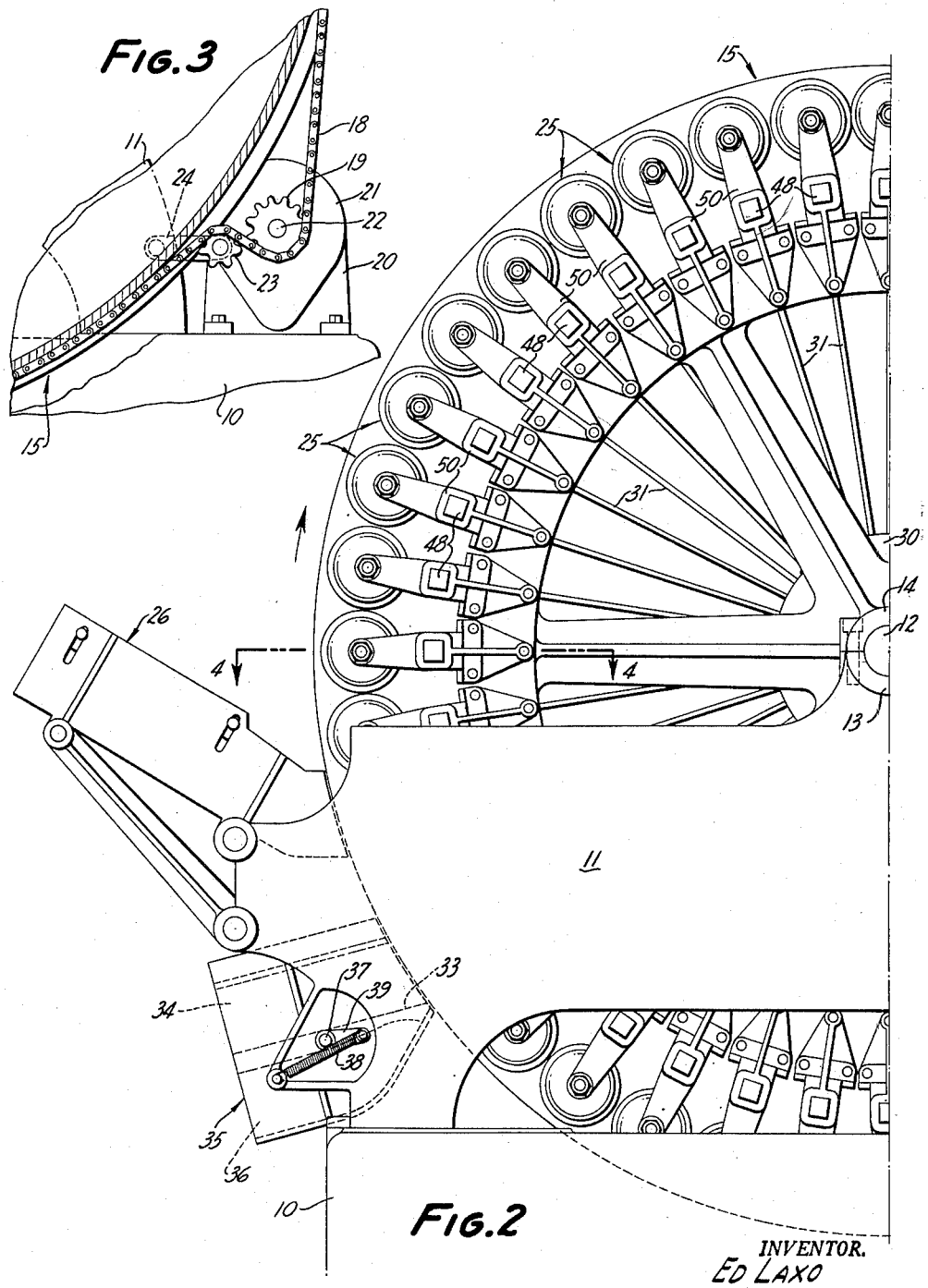

March 10, 1953   E. LAXO   2,630,705
CAN TESTER POCKET ASSEMBLY
Filed Aug. 1, 1947   4 Sheets-Sheet 3

INVENTOR.
ED LAXO
BY
Mellin & Hanscom
ATTORNEYS

March 10, 1953  E. LAXO  2,630,705
CAN TESTER POCKET ASSEMBLY
Filed Aug. 1, 1947  4 Sheets-Sheet 4
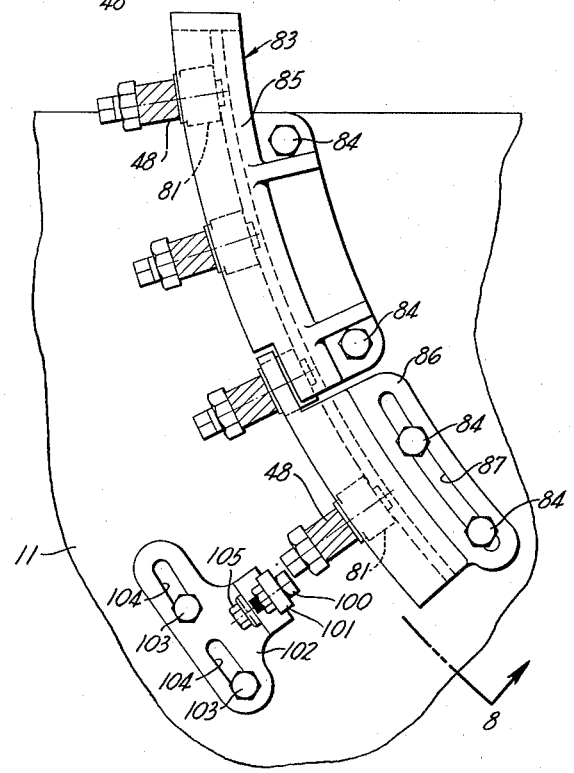
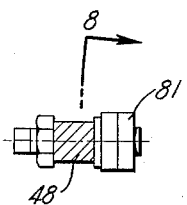
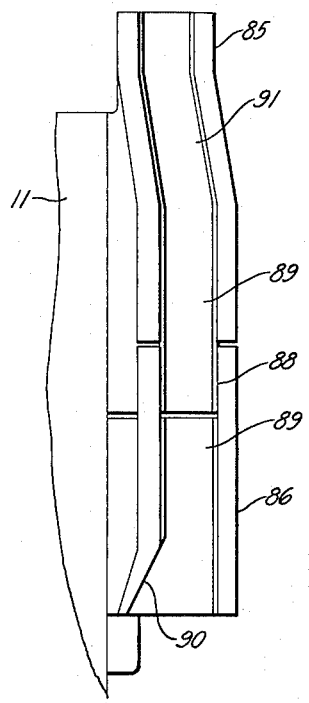
INVENTOR.
ED LAXO
BY
Mellin & Hanscom
ATTORNEYS Patented Mar. 10, 1953

2,630,705

UNITED STATES PATENT OFFICE 2,630,705

CAN TESTER POCKET ASSEMBLY

Ed Laxo, Oakland, Calif., assignor to Atlas Imperial Diesel Engine Co., Oakland, Calif., a corporation of Delaware Application August 1, 1947, Serial No. 765,483

7 Claims. (Cl. 73—43)

The present invention relates to can testers, and more particularly to the pocket assembly portions of such testers in which can bodies are receivable and clamped in place during the testing operation for the reception of compressed air.

Heretofore, can bodies have been supported on a tester carrier wheel in cradles or pockets contoured to fit only one particular diameter of container. If other diameter can bodies were to be tested, replacement of the cradles became necessary, involving a time consuming and costly operation. In addition, a considerable number of parts were maintained in stock, in view of the ten or more sizes of cradles for different can sizes commonly required for fitting to the carrier wheel of each tester, all entailing a large investment.

Accordingly, it is an object of the present invention to provide a can tester having a pocket or cradle assembly which may be adjusted to accommodate a variety of can body diameters, eliminating the need for stocking a large quantity of parts.

A further object of the invention is to provide an adjustable can body cradle or pocket assembly in a can tester which can be readily adapted to accommodate can bodies of different sizes in a fraction of the time heretofore required to physically replace cradles or pockets.

Another object of the invention is to provide a can body cradle or pocket in a can tester, which is adjustable to accommodate can bodies of different diameters or other transverse dimensions, and which supports such bodies in clamped relation on the tester or carrier wheel with their axes at the same locations on the wheel regardless of the can body diameters or other transverse dimensions.

Still another object of the invention is to provide a can body tester having a relatively high capacity and operational rate without affecting the accuracy of the test on each can.

One form which the invention may assume is exemplified in the following description and illustrated by way of example in the accompanying drawings, in which:

Fig. 2 is a half side elevation of the tester, as seen from the right of Fig. 1.

Fig. 3 is a partial side elevation and section of the drive mechanism for the tester.

Fig. 7 is a side elevation of the locking and releasing cam mechanism and also the latch release device, in conjunction with the can carrier shafts.

Fig. 8 is a front view of the stationary locking and releasing cams, as seen generally along the lines 8—8 on Fig. 7.

Figure 1:
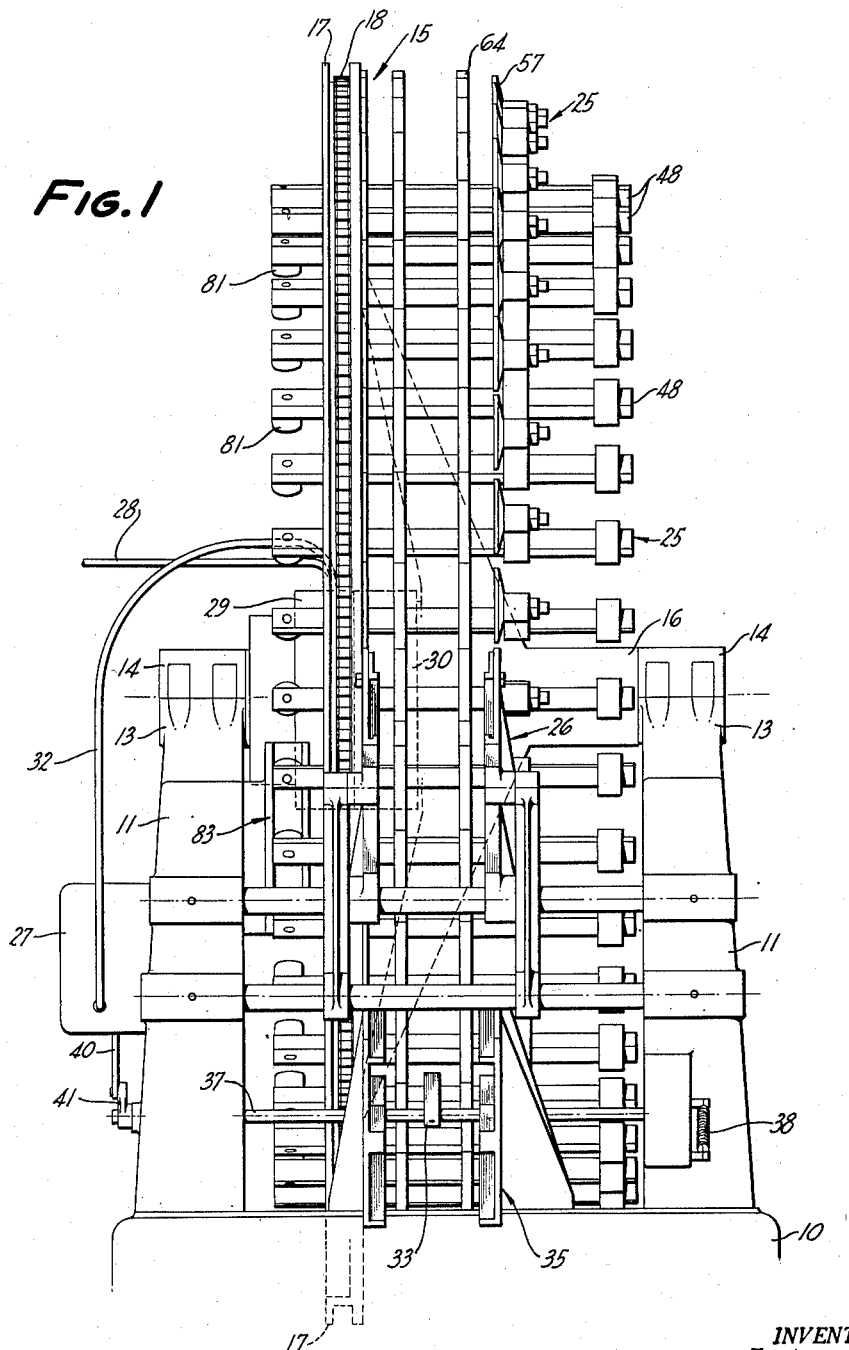
Fig. 1 is a front elevation of a can tester embodying the invention.

As seen in the drawings, the invention is embodied in a can tester, which includes a base 10 and a pair of opposed side frames or legs 11, 11 having a stationary shaft 12 supported at their outer ends within bearing supports 13, the shaft being immovably held in place by bearing caps 14 suitably secured to the supports.

A can carrier wheel 15 is rotatably mounted on the shaft 12 between the supports 11, with its hub 16 extending in opposite directions from the central disk and spoke-like portions of the wheel, to provide adequate bearing surface for the wheel upon the shaft.

The outer portion of the wheel is formed with a peripheral groove 17 receiving an endless chain 18 passing around the driving sprocket 19, of a motive power mechanism. Motion is transmitted to the chain, for the purpose of frictionally driving the carrier wheel 15, from a suitable electric motor 20, which drives a gear reducer 21 whose driven shaft 22 is coupled to the driving sprocket 19. For the purpose of maintaining the chain in proper frictional engagement with the base of the peripheral wheel groove 17, an idler sprocket 23 is mounted upon an arm 24 adjustably clamped to one of the side frames 11 and engaging the exterior of the chain 18. Suitable movement of the idler arm 24 appropriately tensions the chain 18 for frictional engagement with the base of the carrier wheel groove 17 and for proper driving relation with the teeth of the sprocket wheels 19, 23.

The present invention is not concerned with the driving mechanism itself, since any suitable means may be provided for rotating the carrier wheel. Further details of the specific mechanism herein disclosed may be found in my copending application, entitled "Can Tester Drive Mechanism," filed August 1, 1947, Serial No. 765,488.

The carrier wheel has a plurality of pockets 25 arranged circumferentially therearound adjacent its periphery. These pockets are each adapted to accommodate or cradle a can body B (Fig. 4) having a bottom attached thereto, the pockets being equiangularly spaced from one another around the circumference of the wheel. In the specific design disclosed in the drawings, provision is made for forty can pockets spaced nine degrees apart. It is to be understood, however, that a greater or lesser number of pockets may be provided, depending upon the particular can bodies to be tested in the apparatus and the rate of operation desired.

The can bodies proceed downwardly by gravity through a feed chute 26, which can be of any suitable construction, and are deposited successively into the can pockets 25, as the wheel rotates, in which they are immediately thereafter clamped in leakproof relation by mechanisms to be described hereinafter. Air under pressure is then introduced into the can bodies, communication with the source of compressed air supply then being immediately disrupted and the air entrapped in the cans, which are then carried by the carrier wheel 15 to a substantial arcuate extent, until they are placed in communication with a detecting mechanism 27 (Fig. 1) capable of determining whether each can is a good can or bad or leaky can, depending upon the loss of air pressure, if any, within the can body during its arcuate travel with the carrier wheel.

As is known in the can body testing art, air from a suitable source, such as a pressure tank (not shown) whose pressure is maintained by a suitable pump (not shown), enters an air supply line 28 leading into a stationary valve member 29 mounted upon the hub 16 of the carrier wheel. This valve member is prevented from rotation by being suitably secured to a side frame 11 of the tester apparatus. The stationary valve member 29 abuts a rotatable valve member 30 secured to the tester wheel adjacent its hub and having a plurality of circumferentially arranged passages (not shown), one for each can pocket, each communicating through a flexible tubing or hose 31 with a can carrier pocket. The main air supply 28 is successively communicated with each passage (not shown) in the rotatable valve member 30 and the air supply is then cut off to such passage, the air remaining entrapped in the can body within the pocket and the carrier wheel 15 rotated until the passage is placed in communication with another duct (not shown) in the stationary valve member 29 communicating with a detector air line 32 leading to the detector or indicator box 27, which determines whether or not the can B is a good article or a leaky, bad article. This indicator box 27 determines the operation of a gate 33 which causes the can to be discharged into a good can portion 34 of the discharge chute 35, or a poor can portion 36 of such chute.

The gate 33 is secured to an operating shaft 37 extending through the discharge chute and rotatably mounted in the side frames 11 of the machine. A spring 38 connected to an arm 39 secured to the shaft 37 normally maintains the gate 33 in position to cause the cans B to be ejected into the good can portion 34 of the discharge chute. However, the indicator box 27 is capable of closing the circuit to a solenoid (not shown), whenever a leaky can is passing through the tester, which is connected through a suitable link 40 to an arm 41 attached to the gate shaft 37, in order to swing the gate 33 upwardly and cause the leaky can to be ejected into the poor can portion 36 of the discharge chute.

The specific valve mechanism 29, 30 and indicator and discharge chute control mechanism 27, by themselves, are not the subject of the present invention and, in general, are known in the art, as is the cycle of operation herein described. Specific details of such operating mechanisms which may be used in the can tester under consideration may be found in my copending applications, entitled "Can Tester Valve Mechanism," filed August 1, 1947, Serial No. 765,484, now Patent No. 2,482,677, and "Can Tester Leak Detecting Mechanism, filed August 1, 1947, Serial No. 765,485, now Patent No. 2,551,020.

In addition to the foregoing applications, attention is also directed to my application, entitled "Can Tester Feed Mechanism," filed August 1, 1947, Serial No. 765,486, now Patent No. 2,602,532, giving the details of an intake chute device for feeding cans individually and successively into the pockets 25 of the tester wheel 15 as the latter rotates on the shaft 12.

As stated above, the general valve mechanism and detector or indicator mechanism are known in the art. Compressed air is supplied to each can pocket 25 immediately after the can B has passed the feed chute 26 and has been clamped in leakproof relation on the wheel 15, whereupon the air supply is cut off and the can with the entrapped air carried around by the tester wheel to a predetermined extent. In the specific device illustrated in the drawing, the can is carried approximately 330 degrees, whereupon it is placed in communication with the detector air line 32 leading to the indicator box 27, which determines whether or not the can is to be ejected into the good can chute 34 or poor can portion 36 of the discharge chute. It is to be understood that despite specific reference to an arcuate extent of 330 degrees, the position of the discharge chute 35 and the communication of the detector air line 32 with each can pocket 25 can be altered to vary this arcuate extent.

Each can pocket is so constructed and arranged as to be made adjustable, for the purpose of accommodating can bodies of different diameters or other lateral dimensions and also of different lengths. As shown more particularly in Fig. 4, each can pocket 25 includes a supporting bracket 42 secured to the carrier wheel 15 near its outer peripheral portion by screws 43 threaded into the wheel disk 44. This bracket is also secured to the disk portion of the wheel by a central inner screw 45 extending completely through the disk and threaded into another bearing bracket 46. Both brackets have radially outwardly extending bearing supports 47 slidably mounting a carrier shaft 48, maintained from rotation by virtue of its square cross-section and longitudinally slidable fit within companion square bores 49 in the boss portions 47 of the brackets 42, 46.

Each carrier shaft 48 is provided with a pressure arm 50 suitably clamped thereto. As disclosed in the drawing, the inner hub 51 of the arm is mounted on the carrier shaft and may be split to permit its clamping to the shaft upon tightening of a cap screw 52 extending through one ear 53 of the hub and threaded into its other ear 54. The outer end of each pressure arm 50 has a boss 55 through which a threaded stud 56 extends, having a clamp plate 57 secured thereto provided with a central boss 58. The plate 57 may be clamped to the pressure arm 50 by a nut 59 threaded upon the stud 56 and bearing against the boss 55.

The clamp plate 57 is in alignment with a circular pad 60 of suitable flexible material, such as rubber, which is secured to the carrier wheel 15 near its periphery by a threaded stud 61 having a passage 62 communicating with an air passage 63 leading to the flexible hose or tubing 31 running to the air passage in the rotatable valve member 30 previously referred to. A can body B is adapted to be clamped between the circular pad 60 and the clamp plate 57, the open end of the can body engaging the pad and its bottom engaging the clamp plate whose central boss 58 contacts the central portion of the can bottom and prevents the air pressure introduced into the can from bulging the bottom outwardly.

Each can body B is adapted to be cradled in the pocket 25 within a pair of U-shaped brackets 64 which have an inner tongue 65 adjustably received within a companion groove 66 in a slide bracket 67 mounted upon the carrier shaft 48. The slide bracket is split in order to enable its longitudinal slidable adjustment upon the carrier shaft and its clamping in appropriate position by means of a cap screw 68 extending through one side of the split bracket 67 and threaded into the other side. The U-shaped bracket 64 is adjustable with respect to the slide bracket transversely of the carrier shaft 48, and is held in adjusted position by a cap screw 69 extending through a slot 70 in the base portion of the U-shaped bracket and threaded into the slide bracket 67.

Each U-shaped bracket 64 also has a generally L-shaped insert or backstop 71, one leg 72 of which extends within a slot between bifurcated arms 73 of the U-shaped bracket, being swingably mounted on a pivot pin 74 secured to such arms 73. The other leg 75 of the backstop projects inwardly toward the other arm 76 of the bracket and may be fixed in any position of adjustment by tightening a set screw 77 thereagainst which is threaded into one of the bifurcated arms 73 of the bracket.

By virtue of the mode of securing the pressure arm 50 and the slide brackets 67 on the carrier shaft 48, they may be adjusted lengthwise thereof to accommodate can bodies B of different lengths. Since the clamp plate 57 and pressure pad 60 for each pocket 25 have a common, fixed axis, it is desired to support can bodies of different diameters in the U-shaped brackets 64 in such manner that their axes coincide with the clamp plate and circular pad common axis. The U-shaped bracket 64 and L-shaped insert or backstop 71 arrangement insures the provision of such coincidence, by enabling the axis of a can body to lie in a plane radial of the carrier wheel axis and at the same location on the carrier wheel regardless of the size of can body being tested.

Assuming, as an example, that the apparatus has been adjusted for one diameter can body and that it is desired to test a larger diameter can body, the cap screw 69 securing the U-shaped bracket 64 to the slide bracket 67 is loosened and the U-shaped bracket moved transversely of the slide bracket 67 and carrier shaft 48, in order to move its arm 76 away from the radial carrier wheel plane including the axis of the carrier shaft 48, until the can body axis lies in such radial plane, whereupon the cap screw 69 may be tightened to secure the U-shaped bracket 64 in place. Despite the fact that the can body axis now lies in such radial plane, it will not be located coaxially with the clamp plate 60 and circular pad 57. Instead, its axis will be disposed radially outwardly of such desired position of coincidence. Accordingly, the set screw 77 is loosened and the inwardly projecting arm 75 of the backstop is swung back toward the slide bracket 67 until such coincident position is reached, enabling the can body B to move inwardly sufficiently. Thereafter, the set screw 77 is tightened and the projecting arm 75 forms the base of the pocket in which the can body is cradled. If necessary, the U-shaped bracket and projecting arm are shifted again until the desired position of the can body is obtained.

Also, it is seen that by loosening the cap screws 68, 52, the slide brackets 67 and pressure arm 50 may be shifted longitudinally of the carrier shaft 48 to new positions, where they are clamped to the carrier shaft, and by loosening the cap screw 69 and set screw 77 each U-shaped bracket 64 and backstop 71 may be adjusted to provide a size pocket which will cradle the can body B properly with its axis coinciding with the common axis of the clamp plate 57 and circular pad 60. It is apparent that the U-shaped bracket and backstop are adjusted in the opposite direction to that indicated above upon adapting each pocket for the testing of smaller diameter can bodies.

As described above, the can body in each pocket is clamped between the circular pad 60 and the clamp plate 57 and is then unclamped therefrom. Such action occurs as a result of longitudinal movement of the carrier shaft 48 within its supporting brackets 42, 46. This longitudinal movement is effected by providing an inwardly extending eccentric stud 78 in each carrier shaft which is secured in position by a nut 79 threaded on its outer end and engaging the side of the shaft 48. Each stud has an inner eccentric 80 carrying a pair of follower rollers 81 adapted to ride within a cam groove 82 in a segmental cam 83 secured to one of the side frames 11 of the tester by screws, bolts, or the like 84. By suitably turning the eccentric stud 78, and then locking it in place, the position of the pressure arm 50 and the proper clamping and unclamping action of the clamp plate 57 against the bottom of the can body B is assured.

The segmental cam 83 extends only a short distance around the machine adjacent the tester wheel 15. Actually, it extends from approximately the position of the discharge chute 35 to a position slightly ahead of the feed chute 26. The segmental cam 83 is made in two parts (see Figs. 7 and 8), namely, a locking cam segment 85, and a releasing cam segment 86, the latter being secured to the side frame of the tester by a pair of bolts or screws 84 extending through its arcuate slot 87. The releasable cam segment 86 is slidably fitted over an end 88 of the locking cam segment 85, to permit arcuate adjustment between the two segments to a limited extent. By loosening the bolts 84 passing through the arcuate slot 87 and releasing the cam segment 86, it may be shifted with respect to the locking cam segment 85, whereupon the bolts 84 may be tightened and the two cam segments, in effect, caused to function as a single cam 83.

The locking cam segment and releasing cam segment have an intermediate cam track portion 89 for holding each carrier shaft 48 in one direction, in which the pressure arm 50 and clamp plate 57 are held away from the circular pad 60 and can body B, or in an unclamping position. The releasing cam 86 also has a guiding cam face 90 inclined to its intermediate track portion and adapted to be engaged by the follower rollers 81 to move the carrier shaft 48 from a locked position to an unlocked position. On the other hand, the locking cam segment 85 has an inclined cam track portion 91 which will cause the carrier shaft 48 to move in the opposite direction upon entry of the follower rollers 81 therein, in order to shift the clamp plate 57 against the bottom of the can body B and clamp its open end against the circular pad 60 in leakproof relation.

Figure 4:
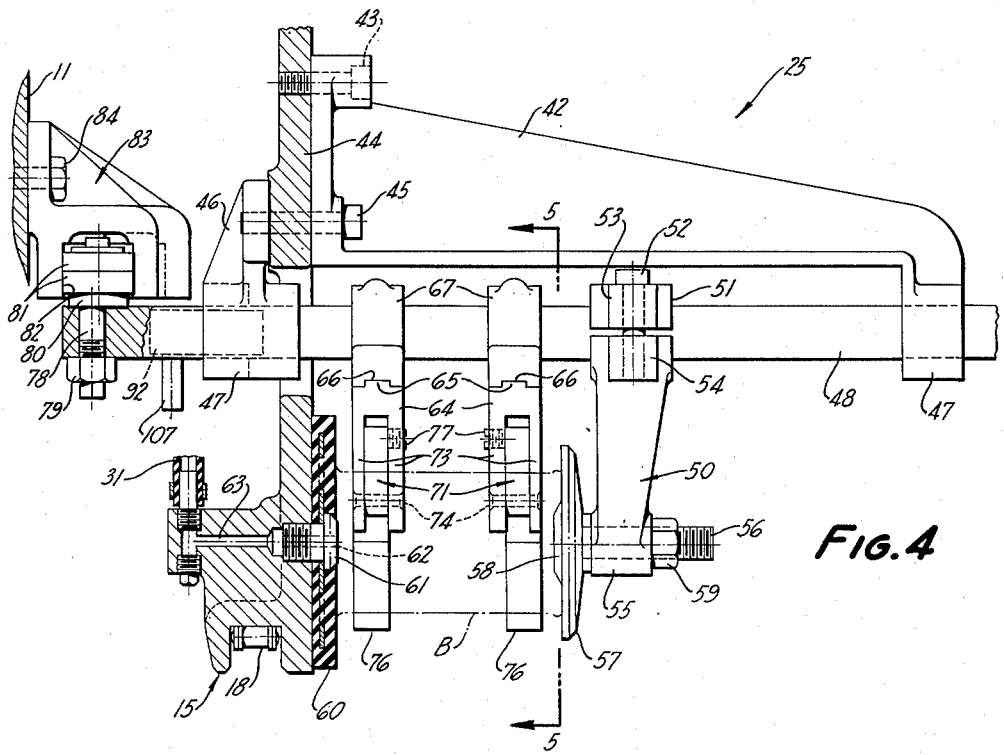
Fig. 4 is a part elevation and part sectional view, on an enlarged scale, taken generally along the line 4—4 on Fig. 2.

As indicated, the cam segments 85, 86 only extend for a comparatively few degrees of arc along the carrier wheel 15. The follower rollers 81 ride out of the cam segment 85 after the carrier shafts 48 have been moved to clamped position. Means are provided for holding this shaft in such locked position prior to disengagement of the follower rollers 81 from the cam 85. The locking mechanism as disclosed in the drawings (see Fig. 6) includes a pawl 92 for each carrier shaft pivotally mounted upon a pin 93 secured to ears 94 extending from the bearing bracket 46. A spring 95 is received within a pocket 96 on the pawl to one side of its pivot pin axis, with the other end of the spring received within a pocket 97 in the bearing bracket 46, such spring 95 tending to swing the pawl 92 about its pivot pin 93 and its nose 98 into a notch 99 formed in one side of the carrier shaft 48. The notch 99 is so positioned that when the carrier shaft is shifted to locking position, or to the left as seen in Fig. 4, the spring pressed pawl 92 snaps into the notch and then prevents the carrier shaft 48 from shifting to the right, as seen in Fig. 4, or to can body releasing position.

The pawl 92, accordingly, holds the carrier shaft 48 and the clamp plate 57 of each pocket in locked position during travel of the pocket 25 with the carrier wheel 15 from the outer end of the locking cam segment 85 almost a complete revolution toward the entry end 90 of the releasing cam segment 86. However, before the releasing cam segment 86 can shift the carrier shaft 48 back to its initial position, it is necessary that the pawl 92 be disengaged therefrom. Such disengagement occurs immediately after the can pocket has been placed in communication with the detector air line 32 and just prior to alignment of such pocket with the discharge chute 35. Specifically (see Figs. 6 and 7), the releasing mechanism for the pawl 92 disclosed in the drawing includes a projection or pin 100 mounted upon a bar 101 extending within a bracket 102 adjustably secured to the side frame 11 of the tester by screws or bolts 103 extending through arcuate bracket slots 104.

Figures 5, 6:
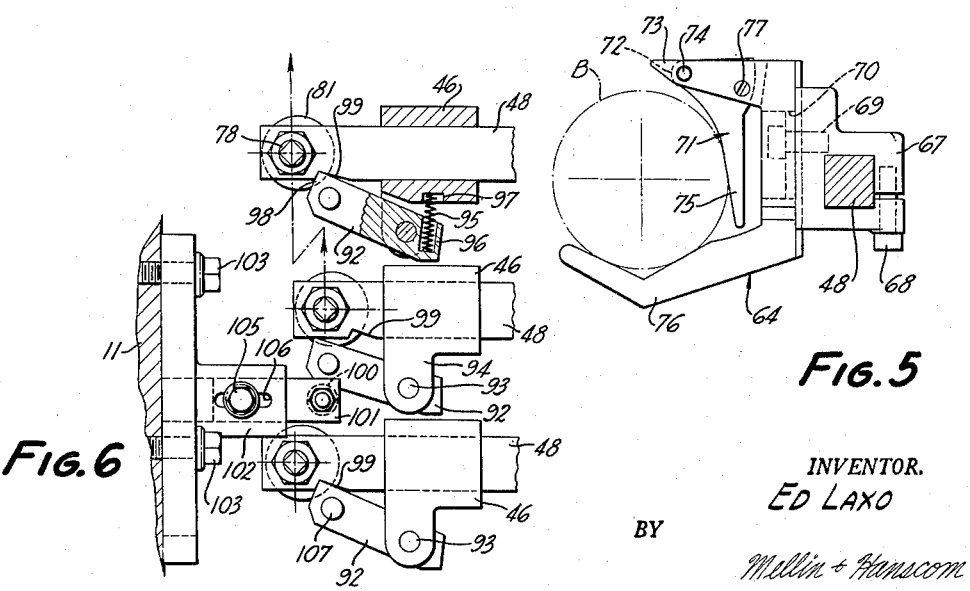
Fig. 5 is a transverse view taken along the line 5—5 on Fig. 4.
Fig. 6 is an elevational view, partly in section, of the mechanism for releasing the latches holding the can carrier shafts in locked position to clamp the can bodies in the carrier wheel pockets.

The bar 101 is shiftable longitudinally within the bracket 102 in order to appropriately position its pin 100 in the path of the pawls 92 by means of a cap screw 105 extending through a slot 106 in the bracket and threaded into the bar (see Fig. 6). By loosening the cap screw 105, the bar 101 may be shifted longitudinally of the tester apparatus until the projection or pin 100 on the bar is in the path of movement of a releasing pin 107 extending outwardly from the side face of each pawl 92 adjacent its locking nose 98. The bracket 102 may be adjusted arcuately in order to appropriately time the point of release of each pawl 92 from the shaft 48, which, as stated above, takes place immediately after communication of the pocket with the detector air line 32 leading to the indicator box 27 and immediately prior to engagement of the cam follower rollers 81 against the inclined releasing cam surface 90.

By referring to Fig. 6, the operation of the pawl releasing mechanism becomes apparent. The carrier shaft 48 in the lowermost pocket is in locked position as it approaches the stationary releasing projection 100, which engages the pawl pin 107 and shifts the pawl 92 outwardly, which then enables the air pressure in the can to move the pressure arm 50 and carrier shaft 48 to unlocked position, or, if there is no air pressure in the can, then the carrier shaft is positively moved to unlocked position, in any event, by engagement of the follower rollers 81 with the inclined face 90 of the releasing cam segment 86. The released position is disclosed in the intermediate pocket in Fig. 6, the uppermost carrier shaft 48 in that figure indicating the relocked position after another can body has entered the empty pocket and been clamped in position through the action of the follower rollers 81 riding up the tapered portion 91 of the locking cam segment 85.

By virtue of the can tester apparatus described, it is unnecessary to completely dismantle pockets or cradles upon changing the sizes of can bodies to be tested. Instead, different lengths of can bodies can be readily accommodated through shifting of the slide brackets 67 and pressure arms 50, which insure that the pockets 25 support the can bodies B at appropriate intervals along their lengths, with the clamp plates 57 exerting sufficient pressure against the bases of the cans to force their open ends in leakproof relation against the circular pads 60. Moreover, it is possible to adjust the contour of each pocket in order to cradle can bodies of different diameters properly, with the axis of each can body held at the desired location in the pocket.

The ability to so adjust the can body avoids any necessity for stocking a large number of cradles or pockets and also eliminates to a large extent the costly and time consuming operation of dismantling such pockets and replacing them with pockets capable of appropriately cradling the different diameter can bodies.

The tester is capable of operation at a comparatively high rate, the relatively large path of travel of each can body, with compressed air contained therein, through about 330 degrees of arc allowing a very substantial time interval for the compressed air to leak from a defective body. Following the trapping of the air and its detection by the indicating detector device 27, assurance is had that the faulty cans will be ejected into the proper portion 34 of the chute 35 and the good cans into the other portion 36 of the discharge chute.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A can tester, including a carrier wheel having a plurality of circumferentially arranged pockets thereon, each of said pockets comprising a carrier shaft mounted on said wheel, a bracket secured to said shaft, a generally U-shaped bracket mounted on said bracket for adjustment transversely of said carrier shaft and having a pair of outwardly extending arms, and a member adjustably mounted on said U-shaped bracket and extending between its arms to vary the distance of the axis of a can body cradled in said U-shaped bracket radially of the carrier wheel axis.

2. A can tester, including a carrier wheel having a plurality of circumferentially arranged pockets thereon, each of said pockets comprising a carrier shaft mounted on said wheel, a bracket secured to said shaft, a generally U-shaped bracket mounted on said bracket for adjustment transversely of said carrier shaft and having a pair of outwardly extending arms, an arm pivotally mounted on one of said outwardly extending arms and depending toward said other outwardly extending arm, and means on one of said arms for locking said projecting arm in various positions of adjustment radially of the carrier wheel axis.

3. A can tester, including a carrier wheel having a plurality of circumferentially arranged pockets thereon, each of said pockets comprising a carrier shaft mounted on said wheel, a sealing pad secured to said wheel, a clamp device spaced longitudinally from said sealing pad and secured to said shaft, a plurality of substantially parallel brackets mounted on said shaft intermediate said pad and device, a generally U-shaped bracket mounted on each of said brackets for adjustment transversely of said carrier shaft, said U-shaped bracket having outwardly extending arms, and a member extending between the arms of each U-shaped bracket and mounted on each U-shaped bracket for adjustment radially of the carrier wheel axis to vary the distance of the axis of a can body cradled in said U-shaped brackets radially of the carrier wheel axis.

4. In a can testing apparatus comprising a carrier wheel and a plurality of circumferentially arranged pockets carried thereby, each said pocket comprising a sealing member and a clamping member spaced from and in axial alignment with said sealing member, the improvement which comprises can supporting means disposed between each said sealing member and clamping member, said supporting means comprising a bracket adapted to receive a can body, said bracket being adjustable radially of the wheel to move the longitudinal axis of a can body in a radial direction, and guide means mounted on said bracket for moving the longitudinal axis of said can body circumferentially of the wheel.

5. In a can testing apparatus comprising a carrier wheel and a plurality of circumferentially arranged pockets carried thereby, each said pocket comprising a sealing member and a clamping member spaced from and in axial alignment with said sealing member, the improvement which comprises can supporting means disposed between said sealing member and clamping member, said supporting means comprising a bracket providing a seat for a can body, a guide member pivotally supported by the bracket and means for clamping said guide member in adjusted position, said bracket being adjustable radially of the wheel to move the longitudinal axis of a can body in a radial direction and said guide member being pivotable circumferentially of the wheel to move said can body longitudinal axis circumferentially thereof.

6. A can tester including a carrier wheel having a plurality of circumferentially arranged pockets thereon, each of said pockets comprising a sealing pad secured to the wheel, said wheel having an aperture formed therein and said aperture being in juxtaposition to the sealing pad, a carrier shaft slidably mounted on said wheel to slide transversely of the wheel, said carrier shaft extending through the aperture formed in said wheel, a clamp device longitudinally spaced from and in axial alignment with said sealing member, said clamp device being mounted on said carrier shaft and longitudinally adjustable along said carrier shaft, a pair of parallel brackets mounted on said carrier shaft intermediate said sealing pad and clamp device, said brackets being adjustable longitudinally of the carrier shaft, a generally U-shaped bracket mounted on each of said parallel brackets, said U-shaped brackets being adjustable transversely of the carrier shaft, and a member extending between the arms of each U-shaped bracket and mounted on each U-shaped bracket for adjustment radially of the carrier wheel axis to vary the distance of the axis of a can body cradled in said U-shaped brackets radially of the carrier wheel axis.

7. A device of the character described comprising, a carrier wheel having a plurality of circumferentially arranged pockets thereon, each of said pockets comprising a sealing pad secured to the wheel, said wheel having an aperture formed therein and said aperture being in juxtaposition to the sealing pad, a carrier shaft slidably mounted on said wheel to slide transversely of the wheel, said carrier shaft extending through the aperture formed in said wheel, a clamp device longitudinally spaced from and in axial alignment with said sealing member, said clamp device being mounted on said carrier shaft and longitudinally adjustable along said carrier shaft, a pair of parallel brackets mounted on said carrier shaft intermediate said sealing pad and clamp device, said brackets being adjustable longitudinally of the carrier shaft, a generally U-shaped bracket mounted on each of said parallel brackets, said U-shaped brackets being adjustable transversely of the carrier shaft, a member extending between the arms of each U-shaped bracket and mounted on each U-shaped bracket for adjustment radially of the carrier wheel axis to vary the distance of the axis of a can body cradled in said U-shaped brackets radially of the carrier wheel axis, a cam follower mounted on said carrier shaft, means for engaging said cam follower to move the same inwardly whereby said carrier shaft, clamp device and U-shaped bracket are forced inwardly toward said sealing pad and a can body cradled in said U-shaped bracket is forcibly held in engagement between said clamp and sealing pad, latch means to hold said carrier shaft in its cammed position, and means to disengage said latch means, said cam follower engaging means being operative to again engage said cam and move the same outwardly whereby said carrier shaft, clamp device and U-shaped brackets are forced outwardly away from said sealing pad and said can body is released.

ED LAXO.

REFERENCES CITED

The following references are of record in the file of this patent:

UNITED STATES PATENTS

| Number | Name | Date |
|---|---|---|
| 783,956 | Holden | Feb. 28, 1905 |
| 1,270,922 | Brenzinger | July 2, 1918 |
| 1,845,362 | Tevander | Feb. 16, 1932 |
| 2,112,621 | Henszey et al. | Mar. 29, 1938 |
| 2,433,043 | Gray | Dec. 23, 1947 |